United States Patent
Moody et al.

(10) Patent No.: US 10,081,058 B2
(45) Date of Patent: Sep. 25, 2018

(54) METHODS OF CONTROLLING NANOWIRE MORPHOLOGY

(71) Applicant: CHAMP GREAT INT'L CORPORATION, Eden Island (SC)

(72) Inventors: Ian Storms Moody, Aptos, CA (US); Hemali Davande, Fremont, CA (US); Jelena Sepa, Mountain View, CA (US)

(73) Assignee: CAM Holding Corporation, Tortola (VG)

(*) Notice: Subject to any disclaimer, the term of this patent is extended or adjusted under 35 U.S.C. 154(b) by 487 days.

(21) Appl. No.: 14/684,313

(22) Filed: Apr. 10, 2015

(65) Prior Publication Data

US 2015/0290715 A1    Oct. 15, 2015

Related U.S. Application Data

(60) Provisional application No. 61/978,715, filed on Apr. 11, 2014.

(51) Int. Cl.
| | |
|---|---|
| B22F 9/24 | (2006.01) |
| C22C 5/06 | (2006.01) |
| H01B 1/02 | (2006.01) |
| H01B 1/22 | (2006.01) |
| C09D 7/00 | (2018.01) |
| B22F 1/00 | (2006.01) |
| C09D 5/24 | (2006.01) |

(52) U.S. Cl.
CPC ............. *B22F 9/24* (2013.01); *B22F 1/0025* (2013.01); *C09D 5/24* (2013.01); *C09D 7/00* (2013.01); *C22C 5/06* (2013.01); *H01B 1/02* (2013.01); *H01B 1/22* (2013.01)

(58) Field of Classification Search
CPC ..... B22F 9/24; B22F 1/00; C22C 5/06; H01B 1/02
USPC ............................................. 420/501; 75/370
See application file for complete search history.

(56) References Cited

U.S. PATENT DOCUMENTS

| | | | |
|---|---|---|---|
| 2008/0210052 A1* | 9/2008 | Allemand | 75/300 |
| 2009/0196788 A1* | 8/2009 | Wang et al. | 420/501 |
| 2011/0045272 A1* | 2/2011 | Allemand | 428/292.1 |
| 2013/0283974 A1 | 10/2013 | Lunn et al. | |

FOREIGN PATENT DOCUMENTS

| | | |
|---|---|---|
| WO | 2008073143 A2 | 6/2008 |
| WO | 2009128973 A2 | 10/2009 |
| WO | 2011031483 A2 | 3/2011 |
| WO | 2012061399 A1 | 5/2012 |
| WO | 2012161907 A2 | 11/2012 |
| WO | 2012171486 A1 | 12/2012 |

OTHER PUBLICATIONS

Int. Search Report/Written Opinion cited in PCT Application No. PCT/US2015/025485 dated Mar. 31, 2016, 12 pgs.

* cited by examiner

*Primary Examiner* — Helene Klemanski

(57) ABSTRACT

Disclosed herein are synthetic methods of producing silver nanowires with controlled morphology, as well as purifying the same. Also disclosed are coating solutions comprising populations of silver nanowires of certain length and diameter distributions.

13 Claims, 12 Drawing Sheets

METHODS OF CONTROLLING NANOWIRE MORPHOLOGY

CROSS-REFERENCE TO RELATED APPLICATIONS

This application claims the benefit under 35 U.S.C. § 119(e) of U.S. Provisional Patent Application No. 61/978,715, filed Apr. 11, 2014, which application is incorporated herein by reference in its entirety.

BACKGROUND

Technical Field

This disclosure relates to the field of nanotechnology, and more specifically to processes of controlling silver nanowire morphology, i.e., their lengths, diameters and aspect ratios.

Description of the Related Art

Silver nanowires are the key components of transparent conductive films, which find wide applications in electronic devices, such as touch panels, photovoltaic cells, flat liquid crystal displays (LCD), organic light emitting diodes (OLED), and the like. Unlike transparent conductive films formed by vacuum depositing a continuous metal oxide layer (e.g., indium tin oxide), metal nanowires can form a conductive film of networking nanowires by a solution-based coating process.

The electrical and optical properties of a transparent conductive film thus formed are dependent on the morphology of the constituent nanowires, i.e., the length and diameter, as well as aspect ratio (length/diameter). Generally, nanowires of high aspect ratios form a more efficient conductive network by allowing a lower density of wires to achieve higher transparency for a given film resistivity. More specifically, because each nanowire can be considered a conductor, individual nanowire's length and diameter can affect the overall network conductivity and as such, the final film conductivity. For instance, as nanowires get longer, fewer may be needed to form a conductive network. Likewise, the diameters of the nanowires also have a direct effect on film conductivity because the thinner the diameter, the higher the resistivity (or the lower the conductivity). Thus, a resulting film may be less conductive for a given silver level.

The lengths and diameters of the silver nanowires also impact the optical transparency and light scattering (haze) of the resulting transparent conductive film. Nanowire networks are optically transparent because the constituent nanowires make up a very small fraction of the film. Nevertheless, the nanowires absorb and scatter light, the extents of which are affected by the lengths and diameters of the constituent nanowires. Generally, thinner nanowires scatter less light, resulting in better optical properties of the film. Furthermore, the optical property is impacted by low aspect ratio nanostructures (a byproduct of the synthesis process) which scatter light without contributing to the conductivity of the network.

U.S. Pat. Nos. 8,454,721 and 8,709,125, in the name of Cambrios Technologies Corporation, are directed to a "polyol" synthesis for preparing silver nanowires. The process involves reacting a silver salt (e.g., silver nitrate), a capping agent (e.g., polyvinyl pyrrolidone), and a chloride source (e.g., quaternary ammonium chloride) in a polyol solvent (e.g., ethylene glycol or propylene glycol). The polyol solvent serves as a reducing agent that reduces the silver salt to elemental silver, whereas the other reactants facilitate the axial growth of the crystalline silver into silver nanowires.

U.S. Published Application Nos. 2011/0174190 and 2013/0291683, in the name of Cambrios Technologies Corporation, are directed to a modified polyol synthesis by which thinner nanowires can be prepared. In particular, the silver salt is added in two stages during the reaction. The resulting silver nanowires have mean diameters of about 26-32 nm and a standard deviation in the range of 4-6 nm; and a mean length of about 10-22 μm.

BRIEF SUMMARY

Described herein are synthetic and purification processes for generating populations of silver nanowires with well-defined size distribution (including lengths and diameters). In particular, by incorporating one or more co-additives such as salt, nitrogen-based amine or small molecules of phenol or aniline derivatives in a polyol synthesis, high aspect ratio silver nanowires are generated at high yields. These silver nanowires can be formulated directly into coating solutions, which can be coated on a substrate to form transparent conductive films.

One embodiment provides a coating solution comprising a plurality of silver nanostructures, wherein more than 80% of the silver nanostructures with aspect ratios of at least 3 are less than about 25 nm in diameter.

Another embodiment provide a coating solution comprising a plurality of silver nanostructures, wherein the silver nanostructures with aspect ratios of at least 3 have a mean diameter of between about 21 and 23 nm and a standard deviation in the range of 3 to 4 nm.

A further embodiment provides a coating solution comprising a plurality of silver nanostructures, wherein more than 95% of the silver nanostructures with aspect ratio of at least 3 have a diameter within 15-30 nm.

Yet another embodiment provides a coating solution of any one of claims 1-3 wherein more than 90% of the silver nanostructures with aspect ratios of at least 3 are more than 5 μm long.

A further embodiment provides a coating solution of any one of claims 1-3, wherein the silver nanostructures with aspect ratios of at least 3 have a mean length of about 12-20 μm, and a standard deviation of about 6 to 8 μm.

Yet another embodiment provides a coating solution of any one of claims 1-3, wherein more than 85% of the silver nanostructures with aspect ratios of at least 3 have a length within 5-25 μm.

A further embodiment provides a process for preparing silver nanowires, the process comprising:

allowing a first-stage reaction mixture to react for a first period of time, the first-stage reaction mixture comprising a polyol solvent, a first portion of a silver salt, a capping agent, a chloride source and a co-additive; and after the first period of time, gradually adding a second portion of the silver salt to the first-stage reaction mixture over a second period of time while maintaining a concentration of less than 0.1% w/w of the silver salt in a total reaction mixture thus formed, wherein the co-additive is:
  (a) a soluble salt having an anion selected from the group consisting of perchlorate, tetrafluoroborate, hexafluorophosphate, triflate, phosphate, thiosulphate, and salicylate;
  (b) a nitrogen-containing base selected from $N(R^1)_3$, optionally substituted pyridine, optionally substituted pyrimidine, optionally substituted pyrazine, and optionally substituted pyridazine, or optionally substituted triazine, wherein each $R^1$ at each occurrence is the same or different and independently hydrogen, optionally substituted alkyl, optionally substituted aralkyl, or two of the $R^1$ groups together with the nitrogen to which they are attached form a N-heterocycle ring;

(c) optionally substituted phenol or hydroquinone; or optionally substituted aniline, and wherein the co-additive is present in a molar ratio of 5%-120% relative to chloride of the chloride source.

In a specific embodiment, the first stage reaction mixture comprises about less than 1.2% (w/w) silver relative to the total weight of the first-stage reaction mixture.

In further embodiment, the silver nanowire crude product produced by the synthetic method is further purified, purifying process comprising:

providing a crude product of silver nanostructures in the polyol solvent, the crude product comprising silver nanowires, allowing the silver nanowires to settle to provide a supernatant comprising low aspect ratio nanostructure; and removing the supernatant comprising low aspect ratio nanostructures.

In another embodiment, the purifying process comprising:

(a) providing a crude product having silver nanowires suspended in a polyol solvent, the crude product further comprising the capping agent;

(b) adding a solvent to the crude product, wherein the capping agent has a solubility in said solvent of less than 5% w/w;

(c) allowing the silver nanowires to sediment to provide a supernatant comprising low aspect ratio nanostructures; and (d) isolating the sedimented silver nanowires from the supernatant.

Additional embodiments are directed to conductive film prepared by a coating solution described herein.

DETAILED DESCRIPTION

Figure 1A:
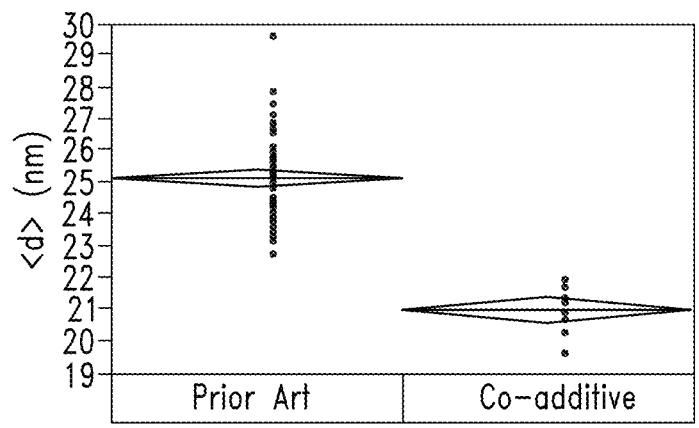
FIG. 1A demonstrates that the average diameters in silver nanowires produced by the process described herein are thinner than those prepared by prior art methods.

Disclosed herein are synthetic processes of producing silver nanowires with controlled length and diameter distributions. The methods may be optionally combined with a purification process to further improve nanowire yields and enrich nanowires with desirable morphology. In particular, the disclosed process produces silver nanowires having thinner diameters than those produced by known polyol syntheses. By controlling the nanowire morphology through synthesis and purification, various embodiments provide populations of nanowires having size distribution profiles that peak at desired diameters or lengths (e.g., mean lengths of about 10 μm and mean diameters of less than 25 nm). These populations of nanowires can be formulated directly into coating solutions for creating transparent conductive films with improved optical properties.

Nanostructure Morphology

Nanostructures are structures in which at least one dimension (e.g., diameter or width) is less than 500 nm, more typically, less than 100 nm or 50 nm. The nanostructures may take any shape or geometry. One way to define the geometry of a given nanostructure is by its "aspect ratio," which refers to the ratio of the length and the diameter of the nanostructure. In certain embodiments, the nanostructures are isotropically shaped (i.e., aspect ratio=1). Typical isotropic or substantially isotropic nanostructures include nanoparticles, defined herein as having aspect ratio of less than 3.

A nanowire is an elongated nanostructure of high aspect ratio of at least 10. Typically, the nanowire has an aspect ratio of at least 50, more typically at least 100, and more typically at least 300.

"Low aspect ratio nanostructures" typically have aspect ratios of less than 10. Low aspect ratio nanostructures include nanoparticles, nanorods and the like. They do not contribute to forming a conductive network; yet contribute to light scattering and haze. They sometimes are referred to as "bright objects" because they appear bright due to light scattering in dark field micrographs.

A crude product prepared by a solution-based approach (including the known polyol synthetic processes) inevitably contains nanostructures of variable lengths, diameters, and aspect ratios, including nanowires as well as low aspect ratio nanostructures. Advantageously, the process described herein is capable of controlling the size distributions of the nanowires synthesized, while minimizing the production of low aspect ratio nanostructures.

Polyol Synthesis with Co-Additives

Disclosed herein includes a polyol synthesis which employs one or more co-additives with a chloride source. More specifically, the polyol synthesis is a two-stage synthesis, in which a silver salt is being reduced and allowed to grow into nanowires in a controlled manner. Without wishing to be bound by any theory, it is believed that a first stage of the synthesis is primarily a seeding process to foster the silver crystal formation and the initial growth of the silver nanowires both in the axial (length) and radial (diameter) directions; whereas the second stage of the synthesis is primarily a growth process that preferentially extends the nanowires in length.

Thus, one embodiment provides a process for preparing silver nanowires, the process comprising:

allowing a first-stage reaction mixture to react for a first period of time, the first-stage reaction mixture comprising a polyol solvent, a first portion of a silver salt, a capping agent, a chloride source and a co-additive; and after the first period of time, gradually adding a second portion of the silver salt to the first-stage reaction mixture over a second period of time while maintaining a concentration of less than 0.1% w/w of the silver salt in a total reaction mixture thus formed, wherein the co-additive is:
(a) a soluble salt having an anion selected from the group consisting of perchlorate, tetrafluoroborate, hexafluorophosphate, triflate, phosphate, thiosulphate, and salicylate;
(b) a nitrogen-containing base selected from $N(R^1)_3$, optionally substituted pyridine, optionally substituted pyrimidine, optionally substituted pyrazine, and optionally substituted pyridazine, wherein each $R^1$ at each occurrence is the same or different and independently hydrogen, optionally substituted alkyl, optionally substituted aralkyl, or two of the $R^1$ groups together with the nitrogen to which they are attached form a N-heterocycle ring;
(c) optionally substituted phenol or hydroquinone; or
(d) optionally substituted aniline, and
wherein the co-additive is present in a molar ratio of 5%-120% relative to chloride of the chloride source.

As used herein, "silver salt" refers to a neutral compound having a silver ion and a negatively charged counter-ion. The counter-ion may be inorganic or organic. Exemplary silver salts include, without limitation: silver nitrate, silver acetate, silver perchlorate, silver fluoride, silver tetrafluoroborate, silver triflate, and the like.

Typically, the silver salt is soluble in the polyol solvent. For instance, the solubility of the silver salt in the reducing solvent is at least 0.001 g/ml, at least 0.05 g/ml, or at least 0.1 g/ml. Reduction of the silver salt produces corresponding elemental silver. The elemental metal crystallizes and grows radially and axially into nanostructures. When the axial growth is substantially favorable than the radial growth, nanostructures of high aspect ratio (e.g., nanowires) are formed.

"Polyol solvent" is a solvent that also functions as a reducing agent, which reduces the silver salt to its corresponding elemental silver. Typically, the reducing solvent is a chemical reagent comprising at least two hydroxyl groups. Examples of the reducing solvents include without limitation, diols, polyols, glycols, or mixtures thereof. More specifically, the polyol solvent can be, for example, ethylene glycol, 1,2-propylene glycol, 1,3-propylene glycol, glycerin, glycerol, and glucose.

"Capping agent" refers to a chemical agent that preferentially interacts and adheres to a lateral surface of a growing nanowire, such that the capping agent confines the lateral surface from growing and encourages a cross section surface of the nanowire to crystallize. Examples of the capping agent include without limitation, poly(vinyl pyrrolidone), polyarylamide, polyacrylic acid, polyvinyl alcohol, poly(ethylene imine), poly(2-ethyloxazoline), polycaprolactam, poly(ethylene glycol), polypropylene carbonate), hydroxyl propyl cellulose, hydroxyl propyl methyl cellulose, gelatin, and bovine serum albumin or any of the copolymers thereof.

"Chloride source" refers to a soluble substance that supplies chloride ions to the reaction mixture. In various embodiments, the chloride source may be metal chlorides, including chlorides of alkali, alkaline earth, transition metals. Examples of the metal chlorides include, without limitation, sodium chloride, potassium chloride, lithium chloride, cesium chloride, magnesium chloride, calcium chloride, iron(II) chloride, iron(III) chloride, copper (I) chloride, copper (II) chloride, nickel chloride, indium chloride, zinc chloride and the like. In yet further embodiments, the chloride source may be a quaternary ammonium chloride represented by $NR_4Cl$, in which, each R is the same or different and independently hydrogen, alkyl, alkenyl, alkynyl, aryl, or aralkyl. Examples of quaternary ammonium chlorides include without limitation: $NH_4Cl$, tetramethylammonium chloride (TMAC), tetrabutylammonium chloride (TBAC), cetyl trimethylammonium chloride (CTAC), $C_8$-$C_{18}$ alkyl dimethyl benzyl ammonium chloride, methyl trioctylammonium chloride (i.e., Aliquat 336®) and the like. Other organic cation chloride salts include tetraphenylphosphonium chloride.

"Co-additive" is a compound co-administered with the chloride source in the first stage of the silver nanowire synthesis. The co-additive may be a soluble salt, a nitrogen-containing base, or a small molecule derived from phenol, hydroquinone or aniline, which are further defined as follows.

In certain embodiments, the co-additive may be a salt comprising a cation, and an anion selected from the group consisting of perchlorate, tetrafluoroborate, hexafluorophosphate, triflate, phosphate, thiosulphate, and salicylate. There is no particular limitation of the cations that are associated with the anions of the salt, so long as the salt is soluble in the polyol solvent. Exemplary cations include sodium, lithium, ammonium, and the like. Thus, the co-additive may be sodium perchlorate, sodium tetrafluroborate (NaBF4), sodium hexafluorophosphate, sodium triflate, sodium phosphate, sodium thiosuplhate, sodium salicylate, lithium perchlorate, lithium tetrafluroborate (LiBF$_4$), lithium hexafluorophosphate, lithium triflate, lithium phosphate, lithium thiosulphate, lithium salicylate, and the like.

In other embodiments, the co-additive is a nitrogen-containing base including, for example, an amine represented by N(R$^1$)$_3$, wherein each R$^1$ at each occurrence is the same or different and independently hydrogen, optionally substituted alkyl or optionally substituted aralkyl. Exemplary amines include trialkylamine (e.g., triethylamine, tributylamine (TBA)), ammonia (NH$_3$ or NH$_4$OH), 2-amino-2-(hydroxymethyl)-1,3-propanediol (Trizma® by Aldrich-Sigma). In other embodiment, two of the R$^1$ groups together with the nitrogen to which they are attached form an N-heterocycle ring. For example, the amine may be cyclic amine such as piperidine, morpholine, pyrrolidine, and the like, all of which may be further substituted with alkyl, hydroxyl, amino, alkoxy, haloalkyl, or carboxylic acid. In further embodiments, the nitrogen-containing base may be optionally substituted pyridine, optionally substituted pyrimidine, optionally substituted pyrazine, optionally substituted pyridazine, and optionally substituted triazine. As used herein, the optional substituents include for example, alkyl, hydroxyl, amino, alkoxy, haloalkyl, and carboxylic acid.

In yet other embodiments, the co-additive is a small organic molecule of phenol, aniline or their respective derivatives, including substituted phenol and substituted aniline, as defined herein. The small molecule typically has a molecular weight of no more than 500, or more typically, no more than 300, or even more typically, no more than 200. A substituted phenol is phenol substituted with one or more substituents such as alkyl, hydroxyl, amino, alkoxy, haloalkyl, carboxylic acid, and the like. Exemplary substituted phenol include, without limitation, catechol (2-hydroxy phenol), 1,4-hydroquinone (4-hydroxyl phenol), gallic acid, resorcinol. Aniline may also be further substituted by one or more substituents such as alkyl, hydroxyl, amino, alkoxy, haloalkyl, carboxylic acid, and the like. The substituents may be of the phenyl ring or of the amine group of aniline. For example, a substituted aniline may be N-methylaniline or 4-methylaniline (or 4-toluidine).

In some embodiments, a precursor of the phenol or substituted phenol may be used as a co-additive, whereby the precursor is capable of being converted to a phenol or substituted phenol in the polyol solvent, which is a reducing agent. For instance, 1,4-benzoquinone may be used as a co-additive. In a polyol solvent, the 1,4-benzoquinone may be readily reduced to 1,4-hydroquinone, which acts as a co-additive to quaternary ammonium chloride.

As used herein, "alkyl" refers to monovalent saturated hydrocarbon structure of between 1 and 20 carbons, in which the carbons are arranged in either a linear or branched manner. Lower alkyl refers to alkyl groups of 1 to 5 carbon atoms. Examples of lower alkyl groups include methyl, ethyl, propyl, isopropyl, butyl, s- and t-butyl and the like. Examples of alkyl groups of longer chains include octyl (C$_8$), decyl (C$_{10}$), dodecyl (C$_{12}$), cetyl (C$_{16}$), and the like. When an alkyl residue having a specific number of carbons is named, all geometric isomers having that number of carbons are contemplated; thus, for example, "butyl" is meant to include n-butyl, sec-butyl, isobutyl and t-butyl; propyl includes n-propyl and isopropyl.

"Aralalkyl" refers to an alkyl substituted by an aryl group such as phenyl. Both the alkyl and phenyl may be further substituted.

"Alkoxy" refers to a radical of the formula —O-alkyl, wherein alkyl is defined herein. Examples include methoxy, ethoxy, propoxy, isopropoxy, and the like.

"Halo" refers to flouro, chloro, bromo or iodo group.

"Haloalkyl" refers to an alkyl, as defined herein, substituted by one or more halo groups. Examples include trifluoromethyl, trichloromethyl and the like.

"N-heterocycle" refers to a stable 3- to 18-membered ring that comprises one to twelve carbon atoms and at least one nitrogen atom at the ring atoms. A N-heterocycle may further contain other heteroatoms as the ring atoms, including oxygen and sulfur. Examples of N-heterocycle radicals include, but are not limited to, morpholine, piperidine, piperazine, pyrrolidine, pyrazolidine, imidazole, and imidazolidine.

"Optionally substituted" means that substitution may or may not be present. Thus, an optionally substituted moiety can be the moiety itself (i.e., the unsubstituted form) as well as the substituted form. For example, a co-additive that is an optionally substituted phenol can be phenol, or a hydroxy-substituted phenol (e.g., catechol or 1,4-hydroquinone).

The relative amounts of the reactants in the first-stage reaction mixture prior to the reaction can be adjusted to control the nanowire morphology.

In various embodiments, the silver content in the first-stage reaction mixture, also referred to as "the initial silver," is no more than 1.2% (w/w) relative to the total weight of the first-stage reaction mixture. In various embodiments, the initial silver concentration is about 0.01-1% (w/w), 0.05%-1% (w/w), 0.1-1% (w/w), 0.5-1% (w/), 0.2-0.7% w/w, or 0.1-0.6% (w/w) relative to the total weight of the first-stage reaction mixture. Preferably, the silver content in the first-stage reaction mixture is about 0.2-0.4% (w/w) relative to the total weight of the first-stage reaction mixture.

In various embodiments, the molar ratio of the co-additive to the initial silver in the first-stage reaction mixture is about 0.2-7% (mol/mol). Preferably, the molar ratio is about 0.2-6% (mol/mol); or 0.2-5% (mol/mol), or 0.2-4% (mol/mol), or 0.2-3% (mol/mol), or 0.2-2% (mol/mol), or 0.2-1% (mol/mol), or more preferably, 0.5-0.8% (mol/mol).

In various embodiments, the molar ratio of the co-additive to the chloride in the first-stage reaction mixture is about 5-120% (mol/mol). Preferably, the molar ratio is about 5-100% (mol/mol); or 5-50% (mol/mol), or 5-20% (mol/mol), or 10-20% (mol/mol), or more preferably, 10-15% (mol/mol).

In various embodiments, the molar ratio of the capping agent (e.g., PVP) to the initial silver in the first-stage reaction mixture is about 100-1000% (mol/mol). Preferably, the molar ratio is about 100-800% (mol/mol); or 100-600% (mol/mol), or 200-500% (mol/mol), or 400-800% (mol/mol), or 300-500% (mol/mol), or more preferably, 400-500% (mol/mol).

In various embodiments, the molar ratio of the chloride to the initial silver in the first-stage reaction mixture is about 1-20% (mol/mol). Preferably, the molar ratio is about 1-15% (mol/mol); or 1-10% (mol/mol), or 2-8% (mol/mol), or more preferably, 2-6% (mol/mol).

In further embodiments, the first portion of the silver salt is allowed to react for a sufficient period of time till at least 80% of the initial silver has been converted to silver nanostructures (including silver nanowires, silver nanoparticles, and the like), before the second portion of the silver salt is added. In preferred embodiments, at least 85% or more preferably, at least 90% of the initial silver is converted to silver nanostructures before the second portion of the silver salt is added. The first period of time thus depends on the reaction conditions such as temperature, the concentration of the initial silver, the relative amount of the reagents. However, it is within the knowledge of a skilled person in the art to monitor the conversion rate as the initial silver is progressively reduced to elemental silver (as silver nanostructures) to determine the first period of time.

Once the conversion target is met (e.g., at least 85% or at least 90% of the initial silver has been converted), the second portion of the silver salt is gradually added at a rate to ensure that the concentration of the silver salt (i.e., silver ion) in the reaction mixture is maintained below 0.1% (w/w).

The second period of time for the second stage reaction may be determined by monitoring the silver nanowires morphology and terminated as they reach the desired size distribution. In various embodiments, at the end of the second stage reaction, the total silver salt that has been added amounts to 0.01-10% w/w of the total reaction mixture thus formed (i.e., the first-stage reaction mixture combined with the second portion of the silver salt). In preferred embodiments, the total silver salt is 0.01-5% w/w of the total reaction mixture.

Figure 1B:
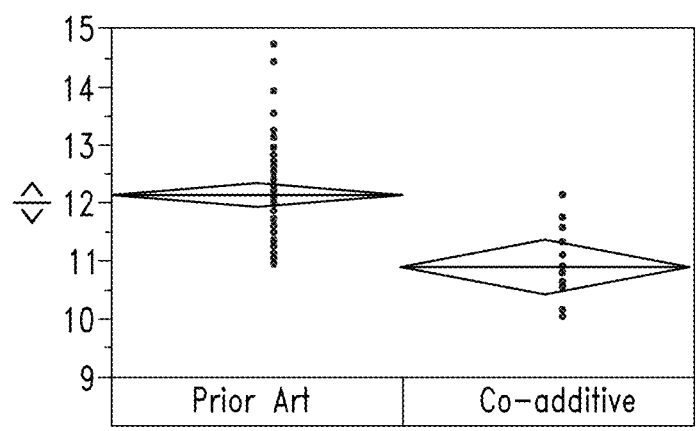
FIG. 1B demonstrates that the average lengths in silver nanowires produced by the process described herein are shorter than those prepared by prior art methods.

FIG. 1A and FIG. 1B demonstrate the average diameter and length variations in silver nanowires produced by the process described herein as compared to the prior art methods as described in U.S. Published Application Nos. 2011/0174190 and 2013/0291683. In particular, FIG. 1A shows that the silver nanowires produced by the disclosed method have shorter average lengths than those produced by the prior art methods. FIG. 1B shows that the silver nanowires produced by the disclosed method have thinner average diameters than those produced by the prior art methods.

Figure 2A:
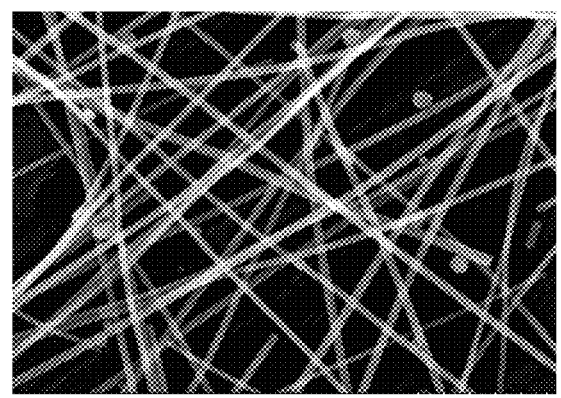
FIG. 2A and FIG. 2B are scanning electron microscope (SEM) images of the silver nanowires produced by a prior art method, and the silver nanowires produced by the presently disclosed methods, respectively.
Figure 2B:
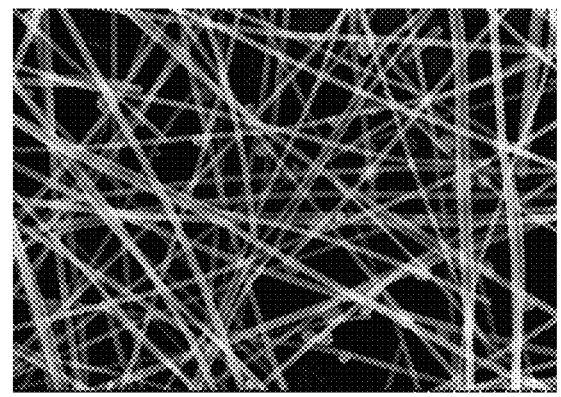

FIG. 2A and FIG. 2B are scanning electron microscope (SEM) images of the silver nanowires produced by the prior art method without the co-additive (FIG. 2A) and the silver nanowires produced by the presently disclosed methods (FIG. 2B). The images were taken at 60 kX. FIGS. 2A and 2B show visually the difference in diameters between the nanowires prepared without a co-additive (thicker) when compared to the nanowires prepared with a co-additive (thinner).

Figure 3A:
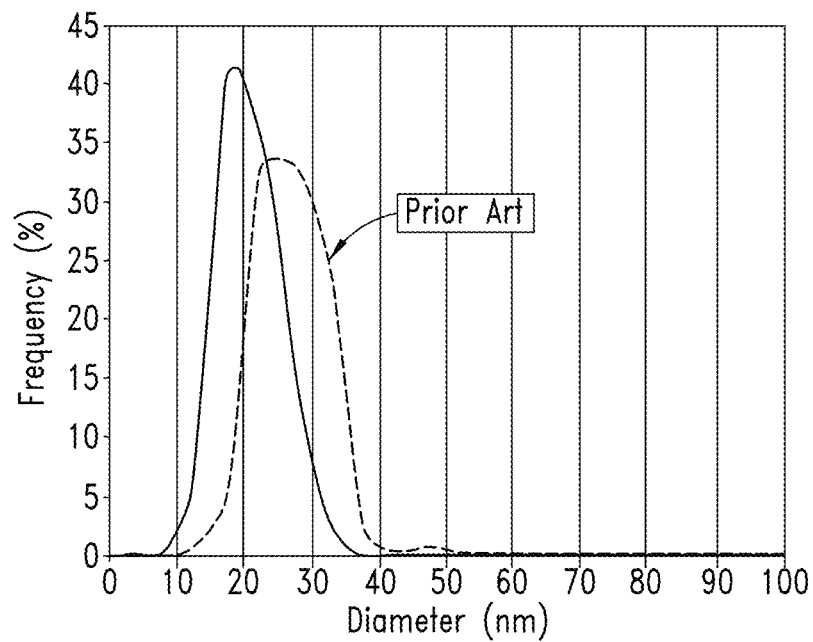
FIG. 3A shows a diameter distribution profile of nanowires prepared according to an embodiment disclosed herein as compared to that of nanowires prepared by a prior art method.

FIG. 3A shows a diameter distribution profile of nanowires prepared according to an embodiment disclosed herein (with a co-additive) as compared to that of nanowires prepared by a prior art method (without a co-additive). As shown, the diameter distribution profile of the nanowires of the present disclosure uniformly shifts by about 5-7 nm thinner as compared to that of the prior art nanowires. In addition, the diameter distribution profile has a narrower spread than that of the prior art nanowires, indicating a more uniform diameter distribution.

Figure 3B:
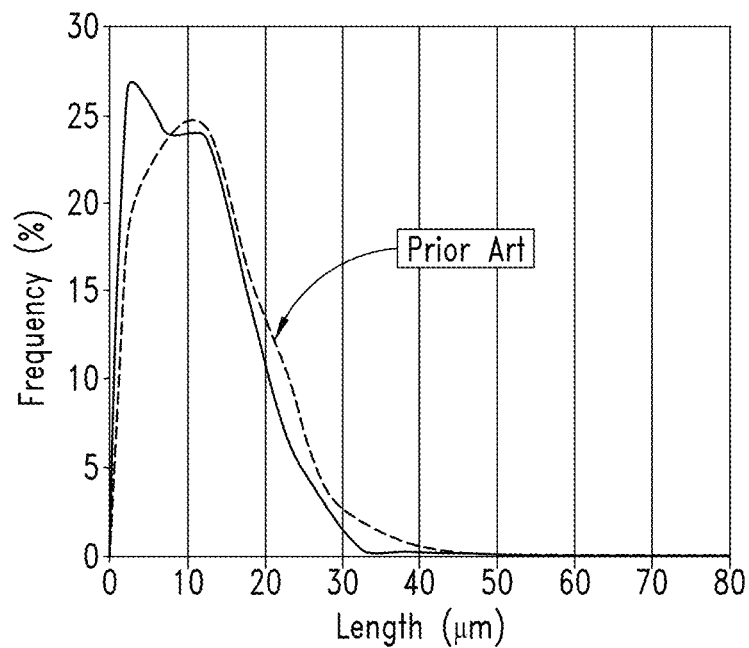
FIG. 3B shows a length distribution profile of nanowires prepared according to an embodiment disclosed herein as compared to that of the nanowires prepared by a prior art method.

FIG. 3B shows a length distribution profile of nanowires prepared according to an embodiment disclosed herein (with a co-additive) as compared to that of the nanowires prepared by a prior art method (without a co-additive). As shown, despite having thinner diameters, the nanowires of the present disclosure have substantially the same lengths as the prior art nanowires, indicating that the nanowires according to the present disclosure tend to have higher aspect ratios than the prior art nanowires.

Figure 4:
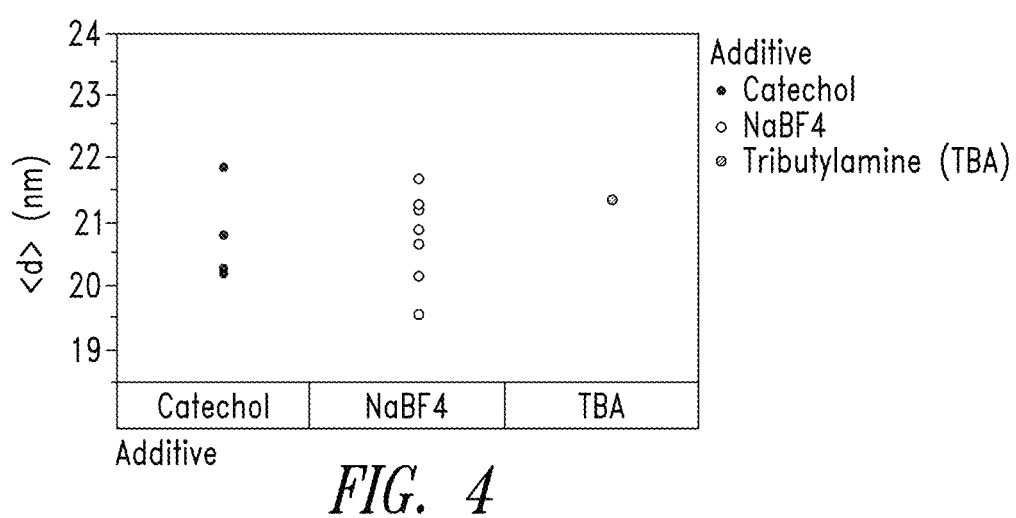
FIG. 4 shows diameter distribution profiles of nanowires prepared by employing three different co-additives, namely, catechol, sodium tetrafluoroborate ($NaBF_4$) and tributylamine (TBA).

FIG. 4 shows the diameter distribution profile of nanowires prepared by employing three different co-additives, namely, catechol, sodium tetrafluoroborate (NaBF$_4$) and tributylamine (TBA). As shown, nanowires produced with the co-additives all exhibit diameters of less than 23 nm, thinner than the nanowires produced by the known polyol processes.

Purification

In general, a polyol synthesis, including the known process, produces a crude product that is a collection of nanowires and low aspect ratio nanostructures, such as nano rods and nanoparticles. Low aspect ratio nanostructures do not participate in the nanowire network conductivity. Shorter nanowires (<5 μm), despite having aspect ratio of at least 10, also do not effectively participate in the nanowires network conductivity. Their presence therefore only contributes to light scattering and can negatively impact the optical properties of a transparent conductor film.

By employing a co-additive in the first-stage reaction mixture, the polyol synthesis described herein provides a crude product that is significantly biased toward production of high aspect ratio nanowires (e.g., ≥300), while minimizing the production of impurities such as the low aspect ratio nanostructures as well as short nanowires. Nevertheless, a purification process can remove low aspect ratio nanostructures and shorter nanowires from the crude product, thereby further enriching the nanowires of the desired morphology within a population of nanostructures.

Typically, in a fixed solvent system, the sedimentation rates depend strongly on nanowire diameter and length. The longer and thicker the nanowires are, the faster they will settle. The thin nanowires produced by the method described herein have average diameters of less than 23 nm, typical purification through sedimentation can be slow and less effective in separation.

On the other hand, because nanowires are attracted to each other electrostatically, the higher the nanowire concentration in the crude product the faster the sedimentation rates are. It is discovered that, by adjusting the relative amounts of the reactants in the first-stage reaction mixture, as well as increasing the amount of the total silver salt, the nanowire yield in the crude product can be sufficiently high that the enhanced electrostatic attraction between the nanowires will more than compensate for the otherwise slowed sedimentation rate associated with thinner nanowires. For instance, one embodiment provides a higher loading of the total silver ([Ag]>0.60 wt %), to provide a crude product comprises higher percentage of nanowires, which could subsequently settled with relatively high yields of 50-65%.

As used herein, sedimentation refers to a process in which the silver nanowires suspended in a solvent settle by force of gravity, not centrifugal force.

Thus, one embodiment provides a purification process for thinner nanowires by sedimentation comprising:

providing a crude product of silver nanostructures in a polyol solvent, the crude product comprising silver nanowires and low aspect ratio nanostructures;

allowing the silver nanowires to settle to provide a supernatant comprising low aspect ratio nanostructure; and removing the supernatant comprising low aspect ratio nanostructures.

Figure 5A:
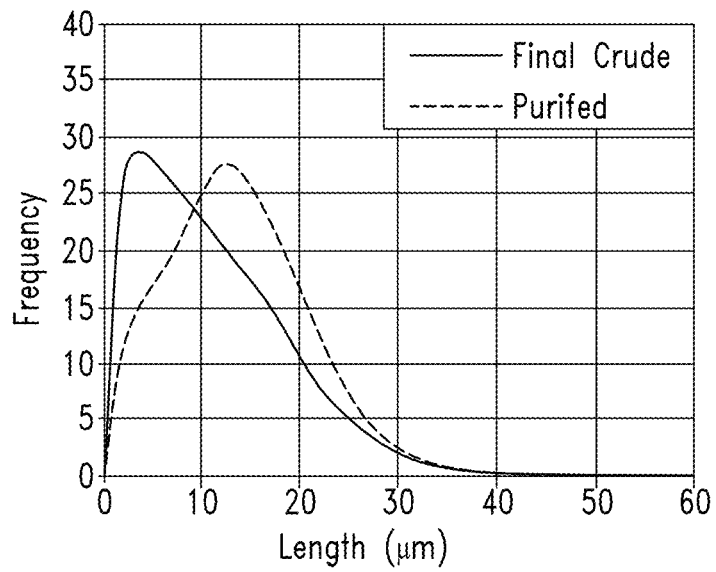
FIG. 5A and FIG. 5B demonstrate the effectiveness of the sedimentation process for purifying high concentration silver nanowires according to an embodiment.
Figure 5B:
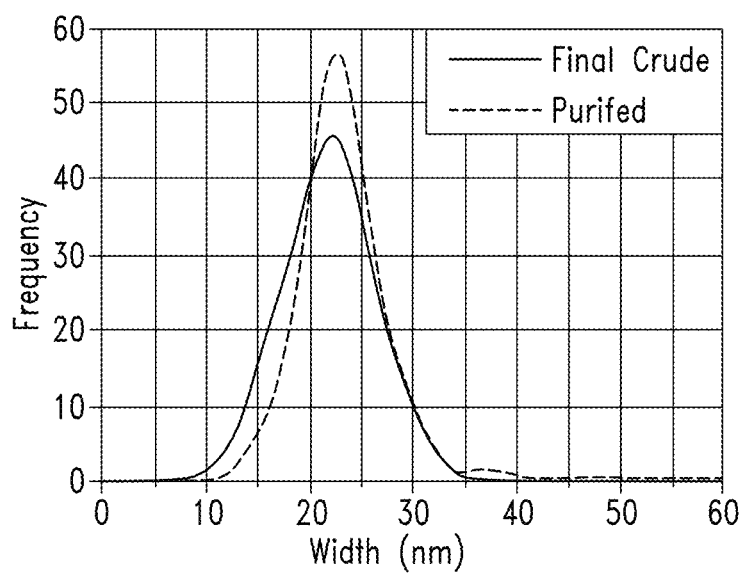

FIG. 5A and FIG. 5B demonstrate the effectiveness of the sedimentation process for purifying high concentration silver nanowires. FIG. 5A shows the length distribution profiles of a crude product and purified product. As shown, the purification removed shorter nanowires, as a result of which the average length are longer. FIG. 5B shows that the width distribution is sufficiently maintained after purification (i.e., the average nanowire diameter remain less than 23 nm).

An alternative purification process relies on the solubility of the capping agent to selectively remove nanowires from a crude product. This process is particularly effective when there is a high level of impurities (e.g., nanoparticles) in the crude product. In particular, because the capping agent (e.g., PVP) tends to adhere to the nanostructures, when a solvent in which PVP is poorly soluble is added to the crude product, the nanostructures along with PVP will rapidly precipitate out of solution. Suitable solvents are those in which a capping agent has a solubility of less than 5% w/w. Examples of the solvents include acetone, methyl ethyl ketone and ethyl acetate. The amount of PVP associated with nanowires is much larger than the amount of PVP associated with nanoparticles, therefore this process favors precipitation of nanowires over nanoparticles, which remain in the supernatant. Once the precipitate of nanowires along with PVP is separated from the supernatant containing nanoparticles, the precipitate can be readily dispersed again in a solvent in which PVP is soluble (e.g., polypropylene glycol, water, ethanol, and the like). This process of precipitating and re-suspending the nanowires can be repeated multiple times to progressively enrich the nanowires while removing nanoparticles. Typically, the repetition can be carried out until the supernatant is clear, which is an indication that the nanoparticles have been maximally removed.

Thus, one embodiment provides a process of purifying nanowires following a polyol synthesis that produces a crude product, the process comprising:

(a) providing a crude product of silver nanowires and low aspect ratio nanostructures suspended in a polyol solvent, the crude product further comprising a capping agent;

(b) adding a solvent to the crude product, wherein the capping agent has a solubility in said solvent of less than 5% w/w;

(c) allowing the silver nanowires to sediment to provide a supernatant comprising low aspect ratio nanostructures; and (d) isolating the sedimented silver nanowires from the supernatant.

A further embodiment provides a process that progressively purifies silver nanowires comprising, after steps d), (e) re-suspending the sedimented silver nanowires in the polyol solvent, and repeating steps (b)-(d).

Nanowire Coating Solutions

The polyol synthesis and the purification process according to the various embodiments described herein provide populations of silver nanostructures having a high percentage of silver nanowires with desired morphology. In particular, the processes enrich the long and thin nanowires within a given population of nanostructures, which can be directly formulated into a coating solution.

Thus, one embodiment provides a coating solution comprising a plurality of silver nanostructures, wherein more than 80% of the silver nanostructures with aspect ratios of at least 3 are less than about 25 nm in diameter.

Another embodiment provides a coating solution comprising a plurality of silver nanostructures, wherein the silver nanostructures with aspect ratios of at least 3 have a mean diameter of between about 21 and 23 nm and a standard deviation in the range of 3 to 4 nm.

Another embodiment provides a coating solution comprising a plurality of silver nanostructures, wherein more than 90% of the silver nanostructures with aspect ratios of at least 3 are more than 5 µm long.

Yet another embodiment provides a coating solution comprising a plurality of silver nanostructures, wherein the silver nanostructures with aspect ratios of at least 3 have a mean length of about 12-20 µm, and a standard deviation of about 6 to 8 µm.

In addition to the silver nanostructures, a coating solution may further comprise a binder, a surfactant and a dispersing fluid.

Examples of suitable binders include hydroxypropyl methyl cellulose (HPMC), methyl cellulose, xanthan gum, polyvinyl alcohol, carboxy methyl cellulose, hydroxy ethyl cellulose.

Representative examples of suitable surfactants include fluorosurfactants such as Capstone® FS-3100 (a nonionic fluorosurfactant sold by DuPont). Other exemplary surfactants include non-ionic surfactants based on alkylphenol ethoxylates. Preferred surfactants include, for example, octylphenol ethoxylates such as TRITON® (x100, x114, x45), and nonylphenol ethoxylates such as TERGITOL® (Dow Chemical Company, Midland Mich.).

Examples of suitable fluids include water and alcohol (e.g., ethanol or isopropanol). More than one solvent may be used. For example, water mixed with isopropanol may be used as the dispersing fluid.

Forming Transparent Conductive Films

To form transparent conductive films on a substrate, the coating solution typically contains about 0.05% to 1.4% of silver (including all silver nanostructures). The substrate can be any material onto which nanowires are deposited. The substrate can be rigid or flexible. Preferably, the substrate is also optically clear, i.e., light transmission of the material is at least 80% in the visible region (400 nm-700 nm).

Examples of rigid substrates include glass, polycarbonates, acrylics, and the like. In particular, specialty glass such as alkali-free glass (e.g., borosilicate), low alkali glass, and zero-expansion glass-ceramic can be used. The specialty glass is particularly suited for thin panel display systems, including Liquid Crystal Display (LCD).

Examples of flexible substrates include, but are not limited to: polyesters (e.g., polyethylene terephthalate (PET), polyester naphthalate, and polycarbonate), polyolefins (e.g., linear, branched, and cyclic polyolefins), polyvinyls (e.g., polyvinyl chloride, polyvinylidene chloride, polyvinyl acetals, polystyrene, polyacrylates, and the like), cellulose ester bases (e.g., cellulose triacetate, cellulose acetate), polysulphones such as polyethersulphone, polyimides, silicones and other conventional polymeric films.

Any coating methods in the art may be used. A referred method is slot-die coating, including slot-die roll-to-roll coating.

As understood by one skilled in the art, other deposition techniques can be employed, e.g., sedimentation flow metered by a narrow channel, die flow, flow on an incline, slit coating, gravure coating, microgravure coating, bead coating, dip coating, slot die coating, spin-coating and the like. Printing techniques can also be used to directly print an ink composition onto a substrate with or without a pattern. For example, inkjet, flexoprinting and screen printing can be employed.

The various embodiments described herein are further illustrated by the following non-limiting examples.

EXAMPLES

Example 1

Nanowire Synthesis Without Co-Additive

Table 1 lists the exemplary reactants in a starting composition as disclosed in U.S. Published Patent Application No. 2011/0174190.

TABLE 1

| Synthesis Reactants | Wt. % in reaction | Molar Ratio to Silver |
|---|---|---|
| Propylene glycol (PG) | 97.51 | 211 |
| Silver Nitrate (AgNO$_3$) | 1.03 | 1 |
| Tetra-n-butylammonium chloride hydrate (TBAC) | 0.02 | 0.014 |
| Polyvinylpyrrolidone (PVP) | 1.44 | 2.13* |

*The molar ratio to PVP refers to PVP repeat unit, not the full polymer chain.

In a typical prior art method, 455 g 1,2-propylene glycol (PG) and 7.2 g of polyvinylpyrrolidone (PVP) (MW: 58,000) were heated to 90° C. and stirred under nitrogen (N$_2$) blanket for 90 min. To the stirring mixture were added: 1.2 g TBAC solution (10% (w/w) in PG), and 18.6 g of silver nitrate (AgNO$_3$) solution (14% (w/w) in PG). The above reaction mixture was then stirred at 90° C. under N$_2$ blanket for 16 hrs. Then 18.6 g AgNO$_3$ (14% in PG) solution was slowly dripped into the reaction vessel over a period of 7 hrs. The reaction mixture was removed from heat and then allowed to cool down to room temperature under N$_2$ blanket while stirring.

The average length and diameter of nanowires were about 12 μm and 25 nm respectively. See FIG. 1A and FIG. 1B.

Example 2

Catechol Co-Additive

In a 1 L reaction vessel, 448 g 1,2-propylene glycol (PG) and 7.2 g of polyvinylpyrrolidone (PVP) (MW: 58,000) were heated to 90° C. and stirred under nitrogen (N$_2$) blanket for 90 min. To the stirring mixture were added: 2.4 g TBAC solution (10% (w/w) in PG), 2.25 g of catechol solution (0.5% (w/w) in PG) and 18.6 g of silver nitrate (AgNO$_3$) solution (14% (w/w) in PG). The above reaction mixture was then stirred at 90° C. under N$_2$ blanket for 16 hrs. Then 38 g AgNO$_3$ (14% in PG) solution was slowly dripped into the reaction vessel over a period of 49 hrs. The reaction mixture was removed from heat and then allowed to cool down to room temperature under N$_2$ blanket while stirring.

The average length and diameter of nanowires were 10.2 μm and 20.3 nm respectively.

Example 3

Catechol Co-Additive

In this example, the reactants were added in a different order from that of Example 2. To a 1 L reaction vessel, 72 g of PVP solution (10% in PG), 18.6 g AgNO$_3$ (10% in PG), 388 g of PG, 2.25 g of catechol (0.5% in PG) and 2.4 g TBAC (10% in PG) were added. The above first-stage reaction mixture was then stirred at 90° C. under N$_2$ blanket for 16.5 hrs. Then 38 g AgNO$_3$ (14% in PG) solution was slowly dripped into the reaction vessel over a period of 49 hrs. The reaction mixture was removed from heat and then allowed to cool down to room temperature under N$_2$ blanket while stirring.

The average length and diameter of nanowires were 11.9 μm and 20.9 nm respectively.

Example 4

Effect of Increased Silver or Chloride Loading

Compared to the prior art method, when catechol was added as a co-additive to the chloride source (TBAC) at 10-100% molar ratios, all the nanowires produced were about 20 nm in diameter, significantly thinner than the diameters produced in Example 1 When the amount of TBAC in the reaction was increased by 100% to 400% as compared to those in Table 1, it was found that additional silver fed (100%-150%), which was added in the second stage, preferentially helped in wire elongation while maintaining the thin diameter (~20 nm).

Figure 6A:
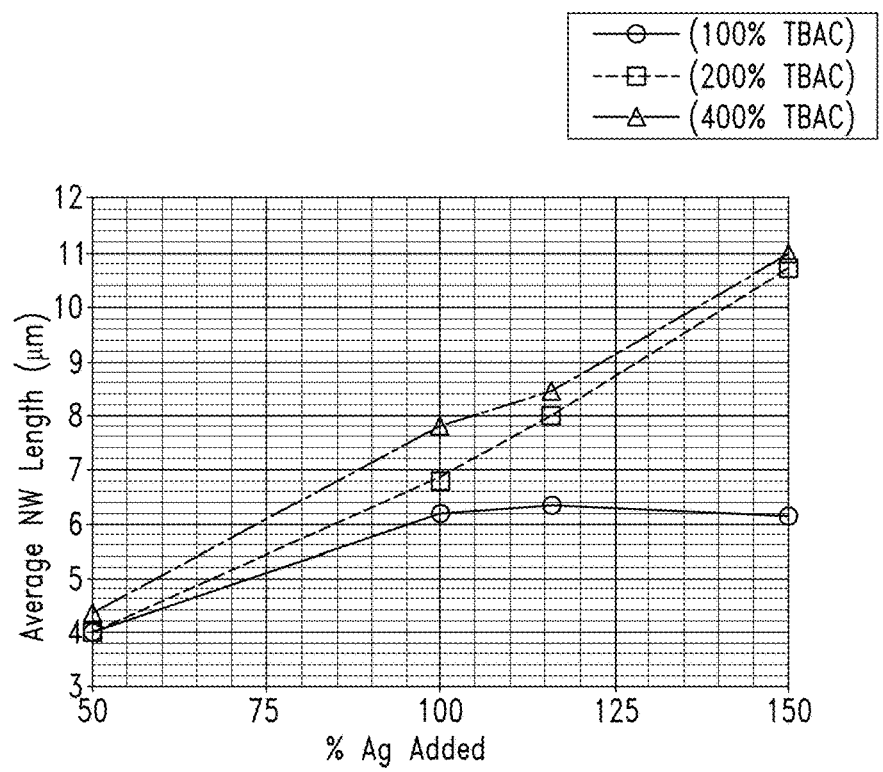
FIG. 6A shows the trend of nanowire length-wise growth when the amounts of silver and chloride were adjusted.

FIG. 6A shows the trend of nanowire length-wise growth when the amounts of silver and TBAC were adjusted. As shown, the lengths increased when both the TBAC and silver loading increased. On the other hand, when the TBAC loading was maintained at 100% (relative to its amount listed in Table 1), increasing silver loading alone did not grow the nanowires length-wise.

Figure 6B:
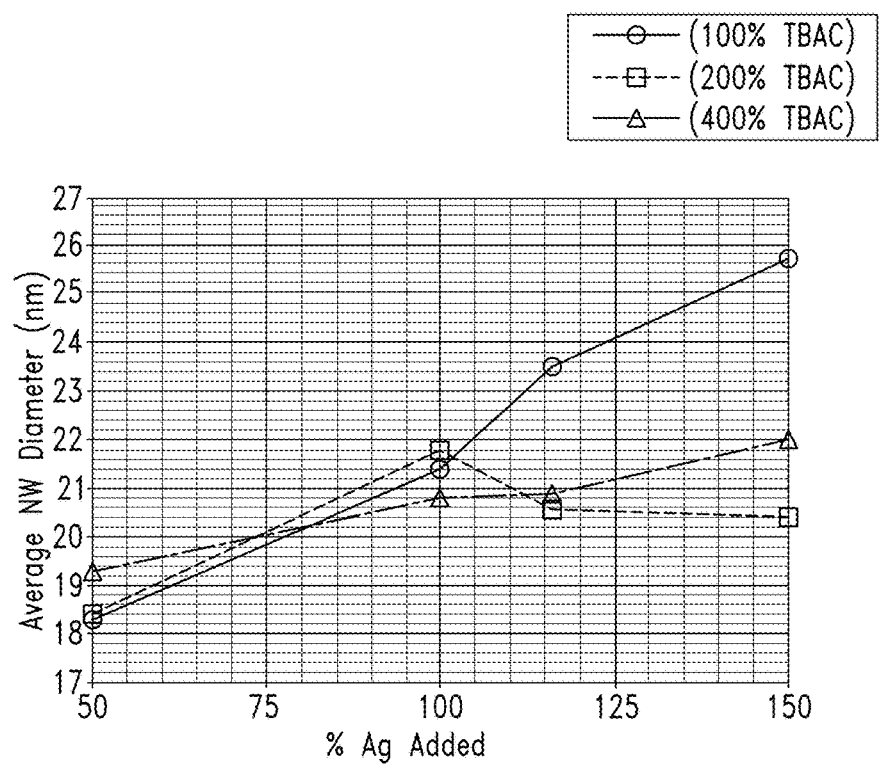
FIG. 6B shows the trend of nanowire diameter growth when the amounts of silver and chloride were adjusted.

FIG. 6B shows the trend of nanowire diameter growth when the amounts of silver and TBAC were adjusted. As shown, increasing both the TBAC and silver loadings (relative to their respective amounts listed in Table 1) managed to maintain the thin diameter at about 20 nm. In contrast, when the TBAC loading was maintained at 100% (relative to its amount listed in Table 1), increasing silver loading would cause the nanowire to grow thicker.

Example 5

Sodium Tetrafluoroborate Co-Additive

In a 1 L reaction vessel, 448 g 1,2-propylene glycol (PG) and 5.4 g of PVP (MW: 58,000) were heated to 90° C. and stirred under N$_2$ blanket for 90 min. To the stirring mixture were added: 1.2 g TBAC solution (10% (w/w) in PG), 6.0 g of sodium tetrafluoroborate solution (NaBF$_4$) (0.5% (w/w) in PG) and 18.6 g of AgNO$_3$ solution (14% (w/w) in PG). The above first-stage reaction mixture was then stirred at 90° C. under N$_2$ blanket for 16 hrs. Then 18.9 g AgNO$_3$ (14% in PG) solution was slowly dripped into the reaction vessel over a period of 24.5 hrs. The reaction mixture was removed from heat and then allowed to cool down to room temperature under N$_2$ blanket while stirring.

The average length and diameter of nanowires were 11.3 μm and 19.7 nm respectively.

Various amounts of sodium tetrafluoroborate ranging in 25%-100% molar ratios of TBAC were also tested. The best yields of nanowires in terms of desirable morphology and minimized nanoparticle generation resulted from 45%-70% molar ratio to the chloride.

Example 6

Sodium Tetrafluoroborate Co-Additive

In this example, the first portion of the silver salt was split up into two fractions (~2:98), the smaller fraction of which ("pre-silver") was initially combined with the remaining reactants. The larger fraction was added over a brief period of time. In a 1 L reaction vessel, 455 g 1,2-propylene glycol (PG) and 7.2 g of PVP (MW: 58,000) were heated to 90° C. and stirred under $N_2$ blanket for 105 min. To the stirring mixture were added: 0.45 g of $AgNO_3$ solution (14% (w/w) in PG), 1.2 g TBAC solution (10% (w/w) in PG), 5.0 g of sodium tetrafluoroborate solution ($NaBF_4$) (0.5% (w/w) in PG). Then 18.2 g of $AgNO_3$ solution (14% (w/w) in PG) was dripped in the vessel over 6 min. The above reaction mixture was then stirred at 90° C. under $N_2$ blanket for 17 hrs. Then 18.9 g $AgNO_3$ (14% in PG) solution was slowly dripped into the reaction vessel over a period of 24.5 hrs. The reaction mixture was removed from heat and then allowed to cool down to room temperature under $N_2$ blanket while stirring.

The average length and diameter of nanowires were 11.3 µm and 21.3 nm respectively.

Example 7

Tributylamine Co-Additive

In a 1 L reaction vessel, 455 g 1,2-propylene glycol (PG) and 5.4 g of PVP (MW: 58,000) were heated to 90° C. and stirred under $N_2$ blanket for 145 min. To the stirring mixture were added: 1.2 g TBAC solution (10% (w/w) in PG), 10.0 g of tributylamine solution (TBA) (0.5% (w/w) in PG). Then 18.6 g of $AgNO_3$ solution (14% (w/w) in PG) was dripped in the vessel over 6 min. The above reaction mixture was then stirred at 90° C. under $N_2$ blanket for 17 hrs. Then 18.6 g $AgNO_3$ (14% in PG) solution was slowly dripped into the reaction vessel over a period of 24 hrs. The reaction mixture was removed from heat and then allowed to cool down to room temperature under $N_2$ blanket while stirring.

The average length and diameter of nanowires were 10.6 µm and 22.3 nm respectively.

Example 8

Effect of Tributylamine Co-Additive and PVP Loadings on Nanowire Morphology

Figure 7:
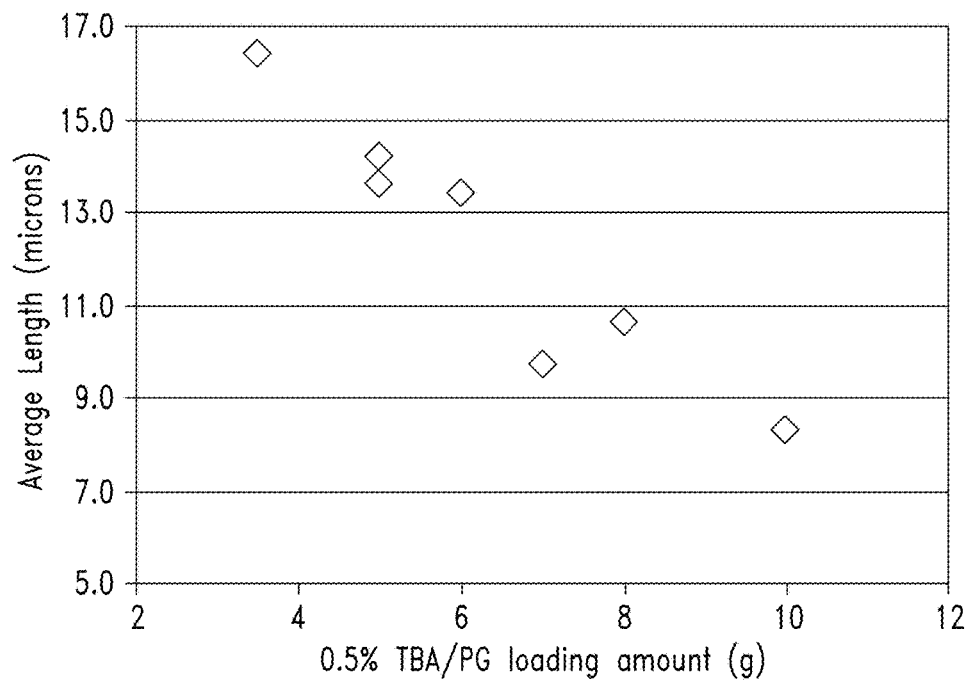
FIG. 7 shows that lowering the co-additive amounts increased the wire length.

Tributylamine was tested at amounts of 25-100% molar ratio to TBAC. FIG. 7 shows that lowering the co-additive amounts increased both wire length and the amounts of nanoparticles.

Figure 8A:
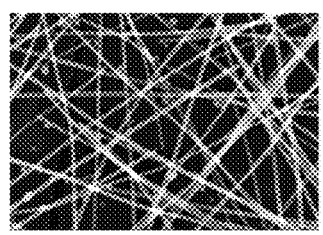
FIGS. 8A, 8B and 8C are SEM images of the nanowires made at PVP loadings of 100%, 75% and 50%, respectively, relative to the PVP loading of prior art method described in Example 1.
Figure 8B:
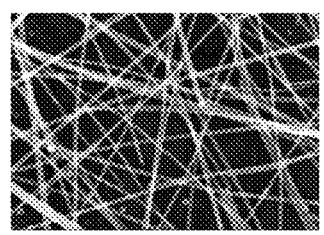
Figure 8C:
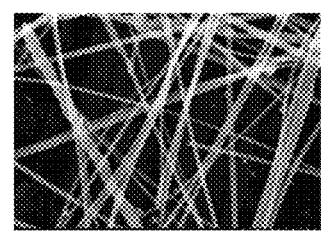

To extend wire length, 25-95% PVP loadings (relative to that of Table 1) were conducted and it was found that 75%-90% PVP loadings extended the wire lengths. FIGS. 8A, 8B and 8C are SEM images of the nanowires made at PVP loadings of 100, 75% and 50%, respectively. Below and above the optimal PVP loading range (75%-90% compared to Chart 1 synthesis), there were more nanoparticles and thicker wires. Splitting the first portion of silver nitrate into pre-silver (0.1 g-0.6 g at 500 g scale) during synthesis also reduced the amount of nanoparticles.

Example 9

Purification by Sedimentation

The crude nanowires described in Example 2 and Example 3, which were synthesized by employing catechol co-additive, were purified by sedimentation. Because the silver loadings (including both portions of silver salt) were high (>0.6% w/w), the yields of the silver nanostructures were high and sedimentation readily occurred due to the enhanced electrostatic attraction between the nanowires. The supernatant, which included nanoparticles and short nanowires (<3 µm), was removed.

The lengths and diameters of the purified nanowires were measured using methods and equipment disclosed in U.S. Published Patent Application No. 2011/0174190, which is incorporated by reference in its entirety. In making nanowire size measurements discussed herein, nanostructures having an aspect ratio of less than about 3 are substantially excluded from the counting. In Example 2, around 25% of the nanostructures (after purification) had aspect ratio of less than 3. In Example 3, around 28% of the nanostructures (after purification) had aspect ratios of less than 3.

Table 2 lists the length distributions of the wires in Examples 1 and 2 in 10 µm bin ranges.

TABLE 2

LENGTH DISTRIBUTIONS

| Bin Size (um) | Example 2 (%) | Example 3 (%) |
|---|---|---|
| 0-5 | 8.16 | 7.30 |
| 5-10 | 18.92 | 17.92 |
| 10-15 | 32.95 | 33.09 |
| 15-20 | 22.37 | 25.24 |
| 20-25 | 10.70 | 11.27 |
| 25-30 | 4.34 | 3.49 |
| 30-35 | 1.56 | 0.89 |
| 35-40 | 0.55 | 0.41 |
| 40-45 | 0.28 | 0.28 |
| 45-50 | 0.09 | 0.04 |
| 50-55 | 0.06 | 0.05 |
| 55-60 | 0.03 | 0.00 |
| 60-65 | 0.00 | 0.00 |
| 65-70 | 0.00 | 0.00 |
| 70-75 | 0.00 | 0.02 |

TABLE 3

STATISTICS OF LENGTHS

| | Example 2 Pure wires | Example 3 Pure wires |
|---|---|---|
| Mean <l> (µm) | 14.2 | 14.2 |
| Stdev (µm) | 7.0 | 6.5 |
| <l²> (µm²) | 251 | 244 |
| Minimum (µm) | 0.6 | 0.6 |
| Maximum (µm) | 56.0 | 72.7 |
| 90$^{th}$ percentile (µm) | 23.0 | 22.4 |
| 95$^{th}$ percentile (µm) | 26.8 | 25.2 |
| Count | 3272 | 5642 |

Figure 9A:
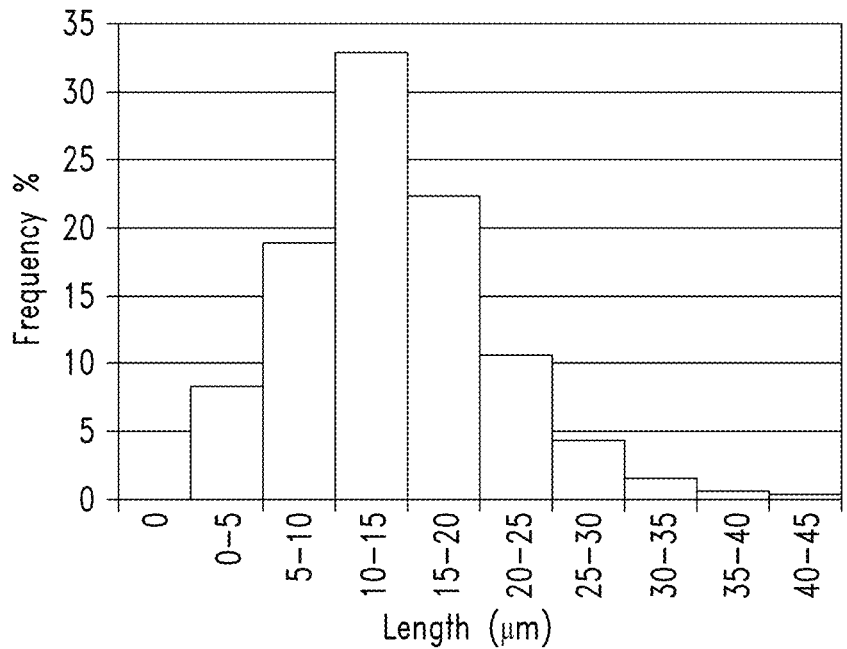
FIG. 9A and FIG. 9B are histograms of the length distributions of purified nanowires from Example 2 and Example 3, respectively.
Figure 9B:
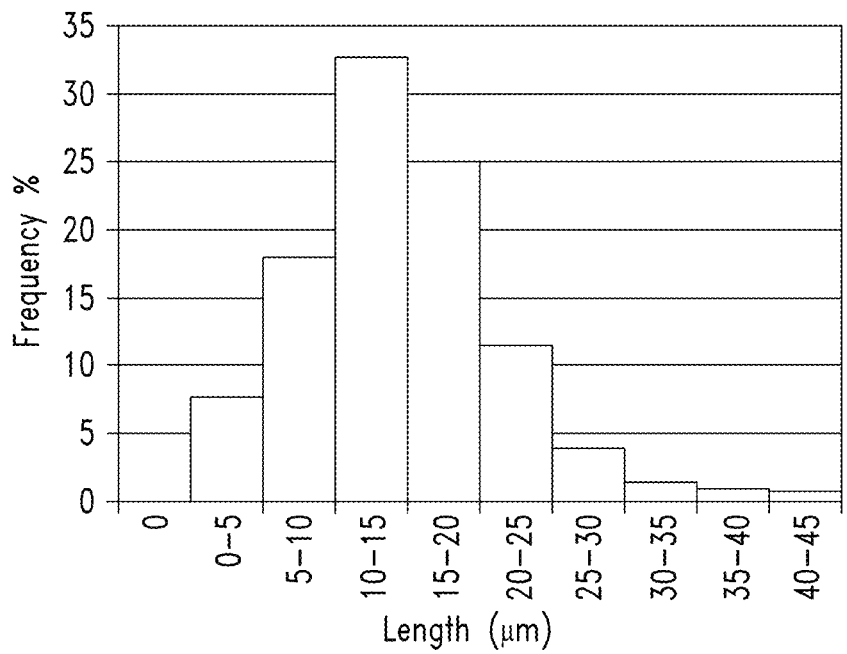

FIG. 9A and FIG. 9B are histograms of the length distributions of purified nanowires from Example 2 and Example 3, respectively.

Table 4 lists the diameter distributions of the nanowires in Examples 2 and 3 in 10 nm bin ranges.

TABLE 4

DIAMETER DISTRIBUTIONS

| Bin Size (nm) | Example 2 (%) | Example 3 (%) |
|---|---|---|
| 0-5 | 0.00 | 0.00 |
| 5-10 | 0.00 | 0.00 |
| 10-15 | 1.26 | 0.00 |
| 15-20 | 23.53 | 18.34 |
| 20-25 | 57.98 | 69.00 |
| 25-30 | 15.13 | 12.23 |
| 30-35 | 1.68 | 0.00 |

TABLE 4-continued

DIAMETER DISTRIBUTIONS

| Bin Size (nm) | Example 2 (%) | Example 3 (%) |
|---|---|---|
| 35-40 | 0.42 | 0.00 |
| 40-45 | 0.00 | 0.00 |
| 45-50 | 0.00 | 0.44 |

TABLE 5

STATISTICS OF DIAMETERS

| | Example 2-<br>Pure wires | Example 3-<br>Pure wires |
|---|---|---|
| Mean $<d>$ (nm) | 22.4 | 22.2 |
| Stdev (nm) | 3.2 | 3.1 |
| $<d^2>$ (nm$^2$) | 511 | 503 |
| Minimum (nm) | 13.1 | 16.0 |
| Maximum (nm) | 36.6 | 47.4 |
| Count | 238 | 229 |
| 90$^{th}$ percentile (nm) | 26.2 | 25.4 |
| 95$^{th}$ percentile (nm) | 27.5 | 26.7 |

Figure 10A:
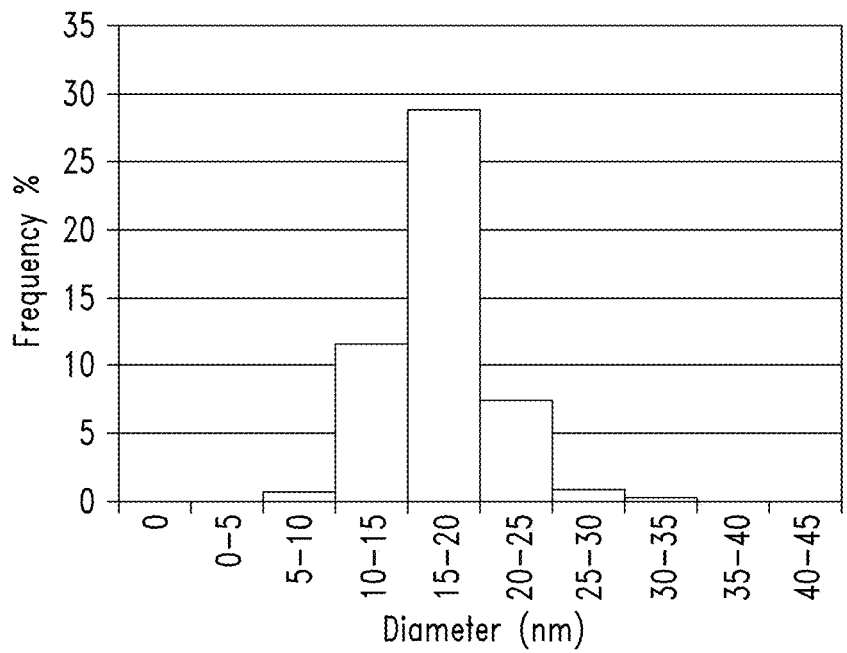
FIG. 10A and FIG. 10B are histograms of the diameter distributions of purified nanowires from Example 2 and Example 3, respectively.
Figure 10B:
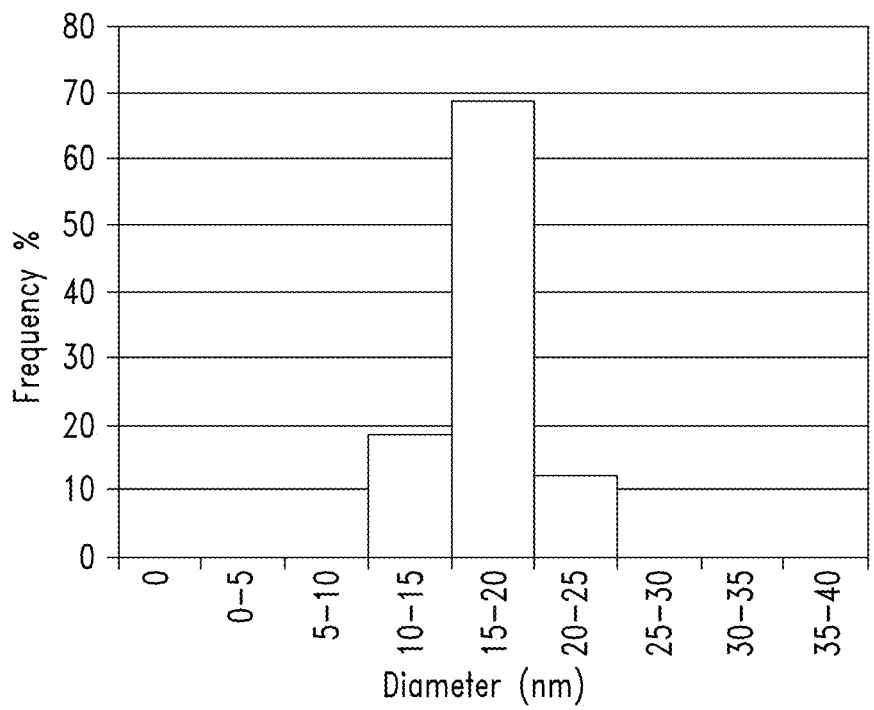

FIG. 10A and FIG. 10B are histograms of the diameters distributions of purified nanowires from Example 2 and Example 3, respectively. As shown, the frequencies of thin nanowires having diameters of less than 25 nm were at least 80%.

Example 10

Purification by Sedimentation and Solvent Wash

The crude product prepared according to Examples 2 and 3 were purified by a multi-step wash process. The process involved washing the crude product with ethyl acetate, precipitating the nanowires, discarding the supernatant, and re-suspending the precipitate in propylene glycol and water.

In order to achieve very high nanowires to nanoparticle ratio in the final purified nanowire solution, the cycle of washing, precipitating and re-suspending steps were repeated until the supernatant became clear, indicating that the nanoparticles have been maximally removed.

Figure 11A:
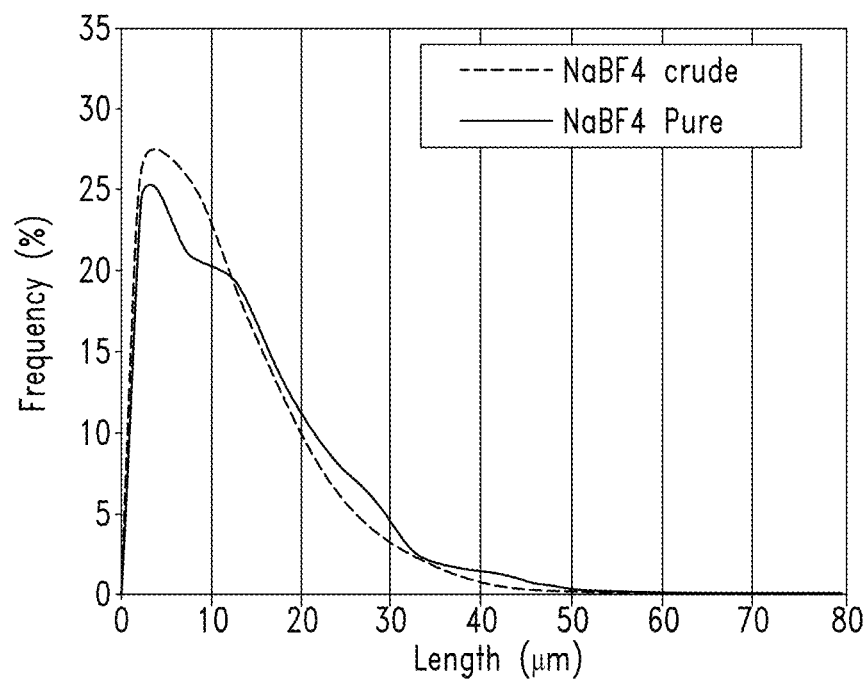
FIG. 11A demonstrates the length distributions of nanowires prepared with sodium tetrafluoroborate co-additive with and without further purification.
Figure 11B:
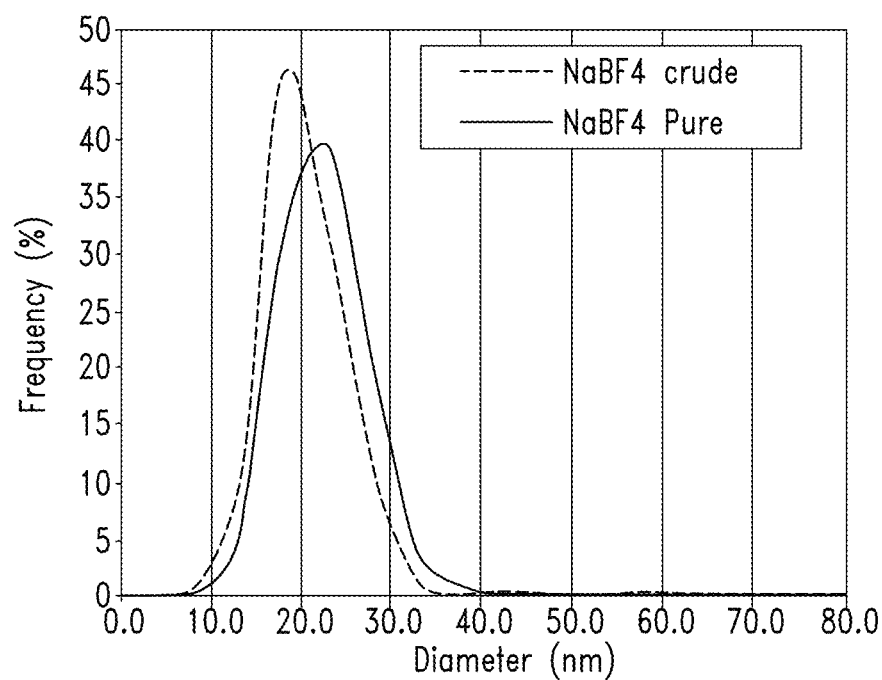
FIG. 11B demonstrates the diameter distributions of nanowires prepared with sodium tetrafluoroborate co-additive with and without further purification.

This multi-step wash process is very effective at removing bright objects from thin nanowires when the ratio of bright objects to nanowires in the crude is very high (e.g., >20 wt %). In addition, this process maintains the diameter and length distributions during purification. Typical purification yields are in the range of 50~60%. The pure wires maintain length and thin diameter as shown in FIG. 11A and FIG. 11B. There is slight shift in diameter by ~1 nm which indicates a loss of some short and thin wires.

Example 11

Purification by Sedimentation

Figure 12A:
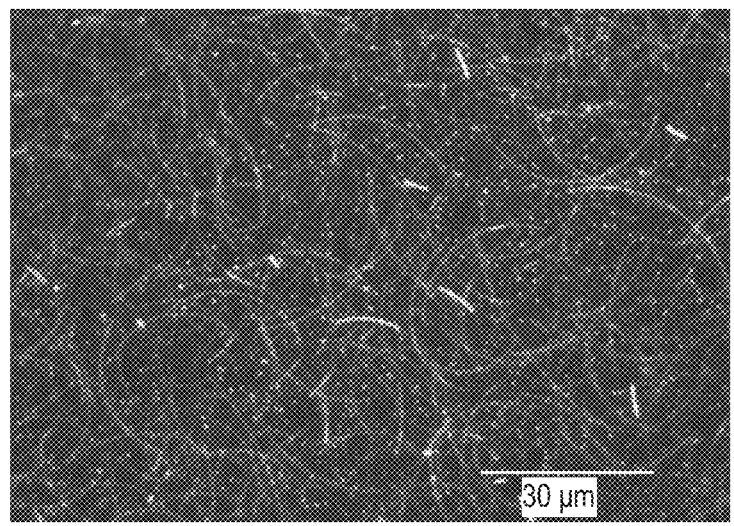
FIG. 12A and FIG. 12B are SEM images of conductive films prepared with nanowires before complete wash and after a complete wash.
Figure 12B:
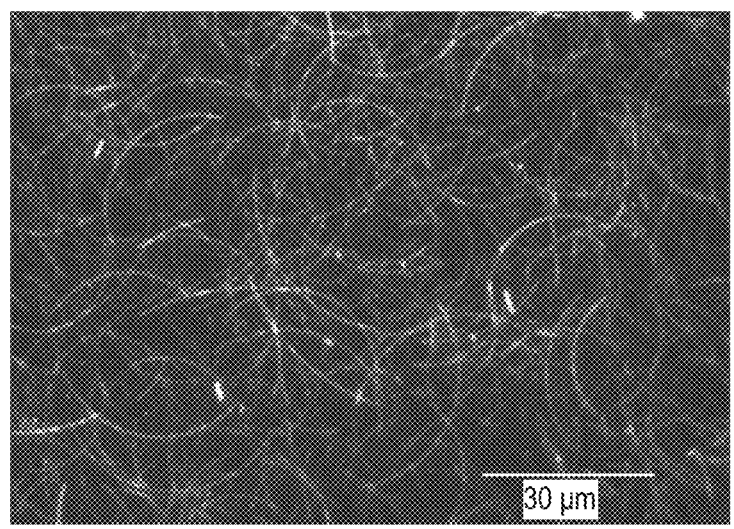

Conductive films were prepared with nanowires before a complete wash and after a complete wash, the SEM images of which are shown in FIG. 12A and FIG. 12B, respectively. Both of these films have similar sheet resistances of 120 ohms/sq and 115 ohms/sq. The film shown in FIG. 12B was made with nanowires that were washed with ethyl acetate and then re-suspended in water and propylene glycol. The cycle of washing and re-suspension was repeated 7-8 times till the sediment turned from muddy brown to copper-like in color. The change in color of the sediment marks the loss of most of the bright particles and completion of the wash process. FIG. 12A shows the film made from nanowires that were washed 4-5 times and before any color change. As shown, the presence of the bright objects still remaining is evident.

As described herein, traditional sedimentation methods are less effective for nanowires with average diameters less than around 23 nm and with solution concentrations lower than around 0.65 wt % silver. However, as demonstrated in Example 11, even for a crude product having low silver content (e.g., <0.65 wt %), it could be first purified by precipitating nanowires out of a solution by adding ethyl acetate, and then re-suspending the precipitates in solution of PG and water at higher silver concentration (e.g., >0.8 wt %). At this high concentration, traditional sedimentation methods can be used to purify thin nanowires with >50% purification yields.

Example 12

Conductive Film Formation from Coating Solutions of Unique Distribution of Nanowires Nanowires obtained from Examples 2 and 3 were purified by the processes discussed in Examples 10 and 11. The purified nanowires were formulated into a series of coating solutions. The coating solution were prepared in water at a silver loading of 0.1-0.2% by weight, a silver to binder mass ratio of 1:2, and a surfactant loading of 250 ppm. The binder was HPMC (Methocel® K100M) and the surfactant was octylphenol ethoxylate (Triton® X-100).

The transparent conductive films were prepared via spin-coating at 1000-3000 rpm for 60 seconds, dried at 50° C. for 90 seconds, and finally baked at 140° C. for 90 seconds.

As a control, nanowires prepared by the method described in U.S. Published Application No. 2011/0174190 were formulated into coating solutions and coated as conductive films in a similar manner.

Figure 13:
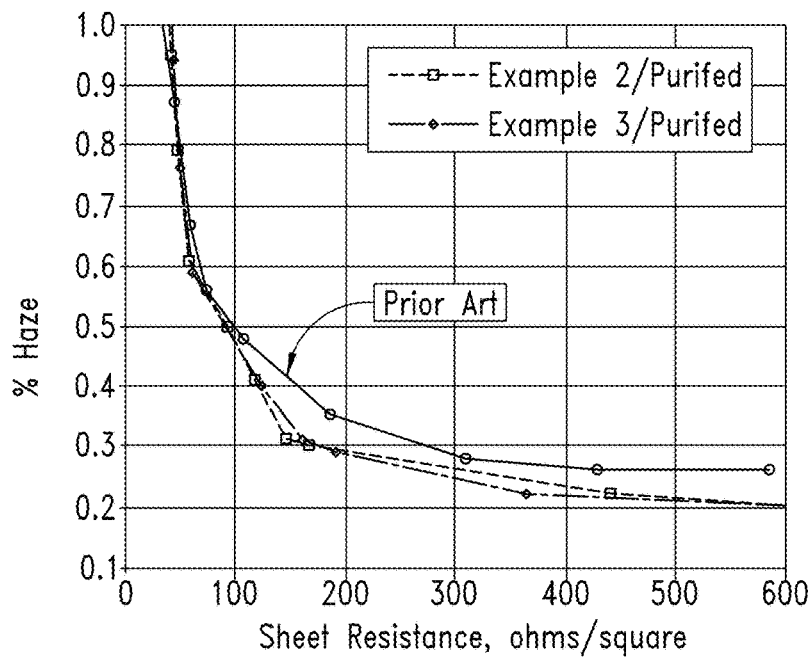
FIG. 13 shows the haze and resistance relation for films prepared using nanowires synthesized according to prior art methods and films prepared using nanowires synthesized in accordance with embodiments disclosed in the present disclosure.

The films were then measured for haze on a BYK Gardner Haze-Gard Plus and sheet resistance on a Delcom Instruments 717 Conductance Meter. FIG. 13 shows the haze and resistance relation for films prepared using nanowires synthesized according to prior art methods and films prepared using nanowires synthesized in accordance with the present disclosure. Films in accordance with the present invention show about 15-20% improvement in haze for a given sheet resistance.

Table 6 shows the spin speed, transmission, haze and sheet resistance of films made with nanowires synthesized in Example 2.

TABLE 6

| Spin Speed (RPM) | Transmission (%) | Haze (%) | Resistance (Ohms/Sq.) |
|---|---|---|---|
| 1000 | 91.40 | 1.26 | 34 |
| 1500 | 91.90 | 0.94 | 44 |
| 2000 | 92.20 | 0.76 | 50.2 |
| 3000 | 92.50 | 0.59 | 61.3 |
| 2000 | 92.90 | 0.40 | 124.1 |
| 3000 | 93.10 | 0.31 | 160.8 |
| 1000 | 93.10 | 0.29 | 191.2 |
| 1500 | 93.20 | 0.22 | 365 |
| 2000 | 93.40 | 0.19 | 751.9 |
| 3000 | 93.40 | 0.15 | 2439 |

Table 7 shows the spin speed, transmission, haze and sheet resistance of films made with nanowires synthesized in Example 3.

TABLE 7

| Spin Speed (RPM) | Transmission (%) | Haze (%) | Resistance (Ohms/Sq.) |
|---|---|---|---|
| 1000 | 91.40 | 1.26 | 32.7 |
| 1500 | 91.90 | 0.95 | 42.4 |
| 2000 | 92.10 | 0.79 | 47.4 |
| 3000 | 92.50 | 0.61 | 58 |
| 1500 | 92.70 | 0.50 | 92.9 |
| 2000 | 92.90 | 0.41 | 118.5 |
| 3000 | 93.10 | 0.31 | 145.8 |
| 1000 | 93.10 | 0.30 | 166.7 |
| 1500 | 93.30 | 0.22 | 440.5 |
| 2000 | 93.40 | 0.20 | 617.3 |
| 3000 | 93.40 | 0.14 | 2381 |

As shown, films made with nanowires synthesized in accordance with the present disclosure have a haze of less than 1.27% at sheet resistance of less than about 35 ohms/sq or less than about 33 ohms/sq; a haze less than about 0.23% at sheet resistance of less than about 366 ohms/sq; and a haze of less than about 0.2% at sheet resistance of less than about 752 ohms/square or less than about 618 ohms/sq.

Figure 14:
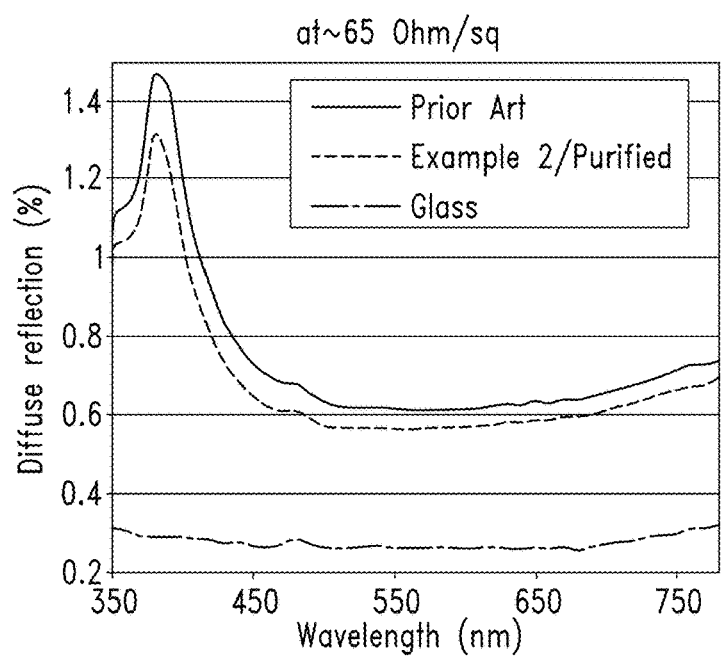
FIG. 14 shows the diffuse reflection in the visible range of a prior art film and a film prepared according to an embodiment described herein, both films having sheet resistance of ~65 ohms/sq.

Due to their thin diameters, nanowires prepared by the polyol synthesis described herein can form conductive films with improved diffuse reflection. The diffuse reflection of the films at sheet resistance of ~65 ohms/sq is plotted in FIG. 14. Films made with nanowires in accordance with the present disclosure have lower diffuse reflection than prior art films. The diffuse reflection of glass is shown for comparison. The haze and diffuse reflection data thus indicate improvement in optical properties by using nanowires having thinner diameters and size distributions described herein.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A process for preparing silver nanowires, the process comprising:
allowing a first-stage reaction mixture to react for a first period of time, the first-stage reaction mixture comprising a polyol solvent, a first portion of a silver salt, a capping agent, a chloride source and a co-additive; and
after the first period of time, gradually adding a second portion of the silver salt to the first-stage reaction mixture over a second period of time in a rate for maintaining a concentration of less than 0.1% w/w of the silver salt in a total reaction mixture thus formed, wherein the co-additive is:
(a) a soluble salt having an anion selected from the group consisting of perchlorate, tetrafluoroborate, hexafluorophosphate, triflate, phosphate, thiosulphate, and salicylate;
(b) a nitrogen-containing base selected from $N(R^1)_3$, optionally substituted pyridine, optionally substituted pyrimidine, optionally substituted pyrazine, and optionally substituted pyridazine, or optionally substituted triazine, wherein each $R^1$ at each occurrence is the same or different and independently hydrogen, optionally substituted alkyl, optionally substituted aralkyl, or two of the R' groups together with the nitrogen to which they are attached form a N-heterocycle ring;
(c) optionally substituted phenol or hydroquinone; or
(d) optionally substituted aniline, and
wherein the co-additive is present in a molar ratio of 5%-120% relative to chloride of the chloride source in the first-stage reaction mixture.

2. The process of claim 1 wherein the first stage reaction mixture comprises about less than 1.2% (w/w) of the silver content relative to the total weight of the first-stage reaction mixture.

3. The process of claim 1 wherein the co-additive is at a molar ratio of about 0.2-7% (mol/mol) of the silver content in the first-stage reaction mixture.

4. The process of claim 1 wherein the chloride is at a molar ratio of 1-20% (mol/mol) to the silver content in the first-stage reaction mixture.

5. The process of claim 1 wherein the capping agent is at a molar ratio of 100-1000% (mol/mol) to the silver content in the first-stage reaction mixture.

6. The process of claim 1 wherein at least 90% of the silver content has converted to the silver nanowires before the second portion of the silver salt is added.

7. The process of claim 1 wherein the first portion of the silver salt and the second portion of the silver salt together are about 0.01-10% w/w of the total reaction mixture.

8. The process of claim 1 wherein the co-additive is a tetrafluoroborate salt, a substituted phenol, or a trialkylamine.

9. The process of claim 8 wherein the co-additive is sodium tetrafluoroborate, catechol, or tributylamine.

10. The process of claim 1 wherein the chloride source is a quaternary ammonium chloride.

11. The process of claim 1 wherein the capping agent is polyvinyl pyrrolidone.

12. The process of claim 1 further comprising purifying the silver nanowires, wherein the purifying process comprises:
providing a crude product of silver nanostructures in the polyol solvent, the crude product comprising silver nanowires,
allowing the silver nanowires to settle to provide a supernatant comprising low aspect ratio nanostructure; and
removing the supernatant comprising low aspect ratio nanostructures.

13. The process of claim 1 further comprising purifying the silver nanowires, wherein the purifying process comprises:
(a) providing a crude product having silver nanowires suspended in a polyol solvent, the crude product further comprising the capping agent;
(b) adding a solvent to the crude product, wherein the capping agent has a solubility in said solvent of less than 5% w/w;

(c) allowing the silver nanowires to sediment to provide a supernatant comprising low aspect ratio nanostructures; and
(d) isolating the sedimented silver nanowires from the supernatant.

* * * * *